US011586502B2

(12) United States Patent
Yeap et al.

(10) Patent No.: US 11,586,502 B2
(45) Date of Patent: Feb. 21, 2023

(54) PERFORMANCE AND DEADLOCK MITIGATION DURING A MEMORY DIE FAIL STORM

(71) Applicant: Micron Technology, Inc., Boise, ID (US)

(72) Inventors: Boon Leong Yeap, Broomfield, CO (US); Matthew Covalt, Meridian, ID (US)

(73) Assignee: MICRON TECHNOLOGY, INC., Boise, ID (US)

( * ) Notice: Subject to any disclaimer, the term of this patent is extended or adjusted under 35 U.S.C. 154(b) by 17 days.

(21) Appl. No.: 17/325,103

(22) Filed: May 19, 2021

(65) Prior Publication Data

US 2022/0374305 A1  Nov. 24, 2022

(51) Int. Cl.
*G06F 11/10*   (2006.01)
*G06F 11/30*   (2006.01)
*G06F 11/07*   (2006.01)

(52) U.S. Cl.
CPC .......... *G06F 11/108* (2013.01); *G06F 11/076* (2013.01); *G06F 11/0772* (2013.01); *G06F 11/1068* (2013.01); *G06F 11/3037* (2013.01)

(58) Field of Classification Search
CPC .. G06F 11/108; G06F 11/076; G06F 11/0772; G06F 11/1068; G06F 11/303
See application file for complete search history.

(56) References Cited

U.S. PATENT DOCUMENTS

| | | | |
|---|---|---|---|
| 2014/0157055 A1* | 6/2014 | Mozak | G11C 29/02 714/33 |
| 2018/0137005 A1* | 5/2018 | Wu | G06F 11/108 |
| 2019/0317855 A1* | 10/2019 | Prathapan | G11C 7/22 |
| 2020/0135280 A1* | 4/2020 | Hu | G06F 3/0619 |
| 2020/0278906 A1* | 9/2020 | Bains | G06F 11/1044 |
| 2021/0303203 A1* | 9/2021 | Eliash | G06F 11/1048 |

* cited by examiner

*Primary Examiner* — Guy J Lamarre
(74) *Attorney, Agent, or Firm* — Nicholson De Vos Webster & Elliott LLP

(57) ABSTRACT

A method is described that includes processing, by a memory subsystem, a read memory command that is addressed to a first die of a memory device. The memory subsystem determines whether processing the read memory command failed to correctly read user data from the first die and, in response to determining that processing the read memory command failed to correctly read user data from the first die, determines whether the first die has failed. In response to determining that the first die has failed, the memory subsystem performs an abbreviated error recovery procedure to successfully perform the read memory command instead of a full error recovery procedure.

20 Claims, 6 Drawing Sheets

| | DIE 302₀ | DIE 302₁ | ... | DIE 302ₓ |
|---|---|---|---|---|
| PROGRAM ERRORS 304A | 0 | 1 | ... | 0 |
| ERASE ERRORS 304B | 0 | 0 | ... | 0 |
| READ ERRORS 304C | 2 | 3 | ... | 0 |
| TOTAL ERRORS 304D | 2 | 4 | ... | 0 |

FIG. 4

PERFORMANCE AND DEADLOCK MITIGATION DURING A MEMORY DIE FAIL STORM

TECHNICAL FIELD

The present disclosure generally relates to performance and deadlock mitigation, and more specifically, relates to performance and deadlock mitigation during a memory die fail storm.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to performance and deadlock mitigation during a memory die fail storm in a memory subsystem. A memory subsystem can be a storage device, a memory module, or a hybrid of a storage device and memory module. Examples of storage devices and memory modules are described below in conjunction with FIG. 1. In general, a host system can utilize a memory subsystem that includes one or more components, such as memory devices that store data. The host system can provide data to be stored at the memory subsystem and can request data to be retrieved from the memory subsystem.

A memory device can be a non-volatile memory device. A non-volatile memory device is a package of one or more dice. One example of non-volatile memory devices is a negative-and (NAND) memory device. Other examples of non-volatile memory devices are described below in conjunction with FIG. 1. The dice in the packages can be assigned to one or more channels for communicating with a memory subsystem controller. Each die can consist of one or more planes. Planes can be grouped into logic units (LUN). For some types of non-volatile memory devices (e.g., NAND memory devices), each plane consists of a set of physical blocks, which are groups of memory cells to store data. A cell is an electronic circuit that stores information.

Depending on the cell type, a cell can store one or more bits of binary information, and has various logic states that correlate to the number of bits being stored. The logic states can be represented by binary values, such as "0" and "1", or combinations of such values. There are various types of cells, such as single-level cells (SLCs), multi-level cells (MLCs), triple-level cells (TLCs), and quad-level cells (QLCs). For example, a SLC can store one bit of information and has two logic states.

Memory devices, including NAND memory devices, often include multiple dice (sometimes referred to as logical unit numbers (LUNs)). The associated memory subsystem performs read and write operations in relation to each memory die to fulfill corresponding memory requests/commands (either internally generated requests/commands or requests/commands from a host system). However, the dice can partially or entirely fail, which results in a consequential inability of the memory subsystem to read and/or write data to the failed dice (i.e., sometimes referred to as a die fail storm, resulting in the inability to perform program, erase, and read operations on the failed dice). In some cases, the memory subsystem can detect that a die is beginning to fail. For example, the memory subsystem can attempt to read data from a portion of a die but, due to bit errors in the read data, the memory subsystem uses error correcting code (ECC) associated with the read data to attempt to correct the bit errors. In response to a failure of the ECC to recover the data, as a result of too many bit errors, the memory subsystem attempts one or more re-reads from the die. In response to failure of these read retries, the memory subsystem performs a redundant array of independent NAND (RAIN) recovery procedure to attempt to read/retrieve the requested data. As will be described below, a RAIN recovery procedure does not rely on the potentially failed die, and instead relies on other dice to read data from the memory devices. However, despite the eventual success to read data from the memory devices using a RAIN recovery procedure, the memory subsystem records this read operation as a failure because data from the originally addressed die could not be used to successfully read the data.

The memory subsystem tracks the number of failed read and/or write operations during a discrete amount of time and, in response to the number of failed read and/or write operations meeting a failure threshold (e.g., one-hundred failed read and/or write operations), the memory subsystem triggers the movement of data from the failed/source die to a new/target die. In particular, the memory subsystem reads data from block stripes of the failed/source die and writes the data to a free block stripe in a target die. However, since the source die has failed, the memory subsystem will need to attempt a time intensive recovery procedure to read data from the source die before writing the data to the target die. As described above, this recovery procedure includes a number of read retries and an eventual RAIN recovery procedure in response to failure of the read retries. Further, this data movement process requires free block stripes in the target die to accommodate the writes. To ensure free block stripes are readily available, the memory subsystem performs a garbage collection procedure to fold/move data and generate free block stripes. However, due to the large number of write operations that need to be performed to move data of the source die into the target die, the memory subsystem may not be able to perform garbage collection quickly enough and the memory devices could run out of free block stripes. In particular, the garbage collection process could be unable to replenish free block stripes to meet the demand of writes from the data movement process involving the failed/source die, in addition to processing host write requests from a host system. Further, since host write requests take preference over internally generated write requests, such as those that are part of garbage collection processes or moving/folding data from a failed die to ensure good quality of service to the host system, the host write requests might cause a deadlock in the memory subsystem. In particular, host requests are preferentially placed in a write command buffer of the memory subsystem as they are awaiting fulfillment. However, since write requests associated with garbage collection cannot be fulfilled, free block stripes are not available to fulfill the host write requests. Accordingly, the host write requests remain in the write command buffer waiting for block stripes, which never become available. This lack of movement in the write command buffer causes a deadlock, where memory requests cannot be processed in the memory subsystem.

Aspects of the present disclosure address the above and other deficiencies by efficiently detecting and mitigating effects of the failure of a die within a memory device (i.e., a die fail storm). In particular, the memory subsystem tracks errors (e.g., program, erase, and read errors) for each die in a set of memory devices. While the number/rate of errors for a particular die fails to meet a threshold (e.g., remains below a threshold), the memory subsystem performs a full error recovery procedure. The full error recovery procedure can include multiple read retries in addition to a RAIN recovery procedure (when all the read retries fail). However, when the number/rate of errors for a particular die meets the threshold (e.g., equal to or above the threshold), the memory subsystem performs an abbreviated error recovery procedure (sometimes referred to as a partial error recovery procedure). The abbreviated error recovery procedure includes a subset of the operations of the full error recovery procedure. For example, the abbreviated error recovery procedure can only include a RAIN recovery procedure and does not include any read retries, which are present in the full error recovery procedure. This technique ensures that resources devoted to error recovery are not wasted on operations that are unlikely to be successful. Namely, if there are a high number of errors associated with a particular die, the die has likely failed and performing read retry operations on the die will not produce a successful result. In contrast, a RAIN recovery procedure, as will be described in greater detail below, does not rely on the potentially failed die to read/retrieve data but instead relies on other dies for data retrieval. Accordingly, by skipping read retry operations through an abbreviated error recovery procedure, the memory subsystem can improve read performance and reduce the likelihood of a deadlock situation when a die has failed by increasing the rate at which data can be transferred from a failed die to a functioning/target die. In particular, skipping read retry operations through an abbreviated error recovery procedure increases efficiency/performance in relation to folding read requests such that free block stripes are replenished more quickly to avoid a deadlock situation in which no free block stripes are available to fulfill write requests. Further details of these techniques will be described below.

Figure 1:
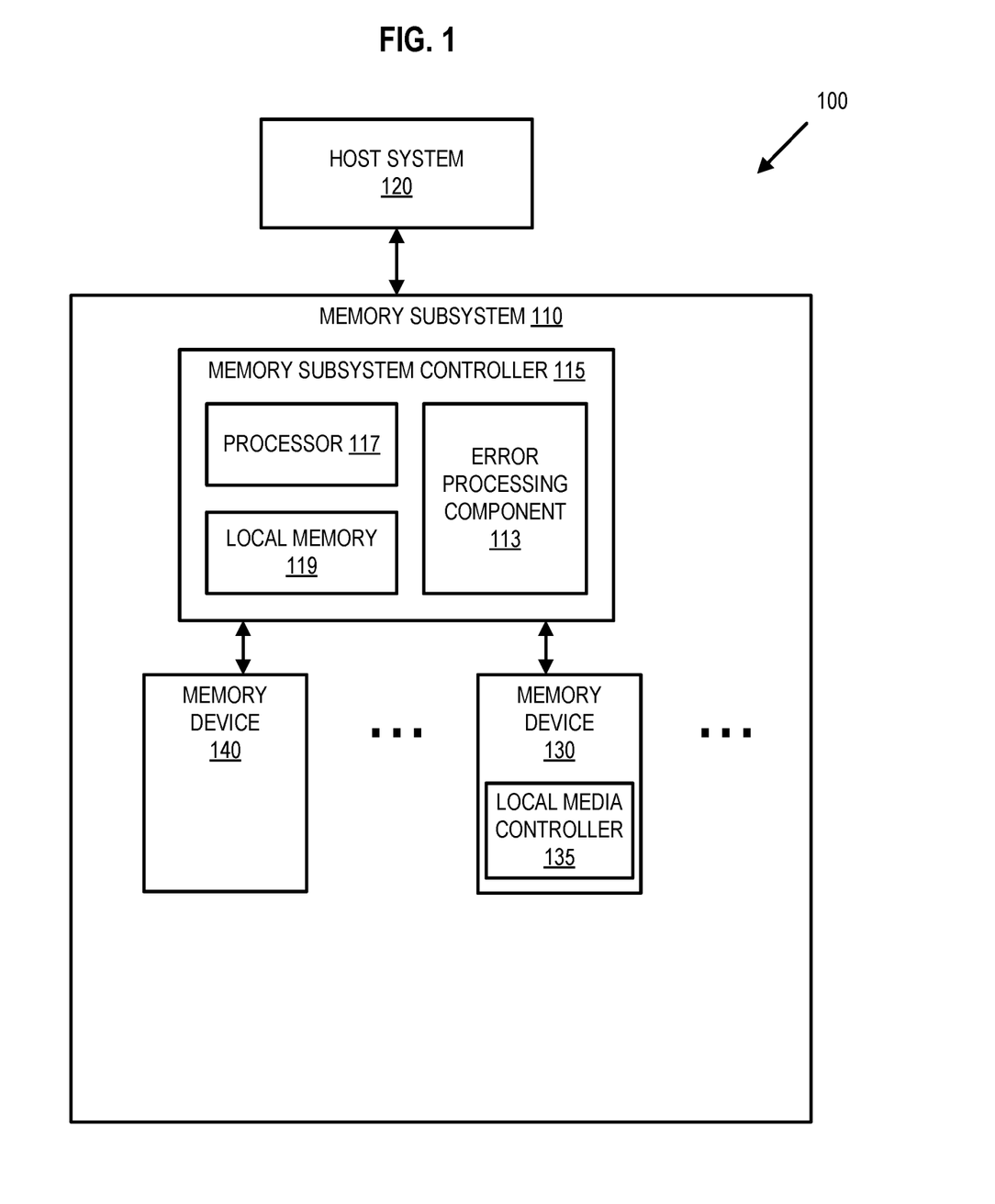
FIG. 1 illustrates an example computing system that includes a memory subsystem, in accordance with some embodiments of the present disclosure.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM)

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes an error processing component 113 that can detect and mitigate memory errors to account for a failed memory die/logical unit number (LUN). In some embodiments, the controller 115 includes at least a portion of the error processing component 113. For example, the controller 115 can include a processor 117 (processing device) configured to execute instructions stored in local memory 119 for performing the operations described herein. In some embodiments, an error processing component 113 is part of the host system 120, an application, or an operating system. Further details with regards to the operations of the error processing component 113 are described below.

Figure 2:
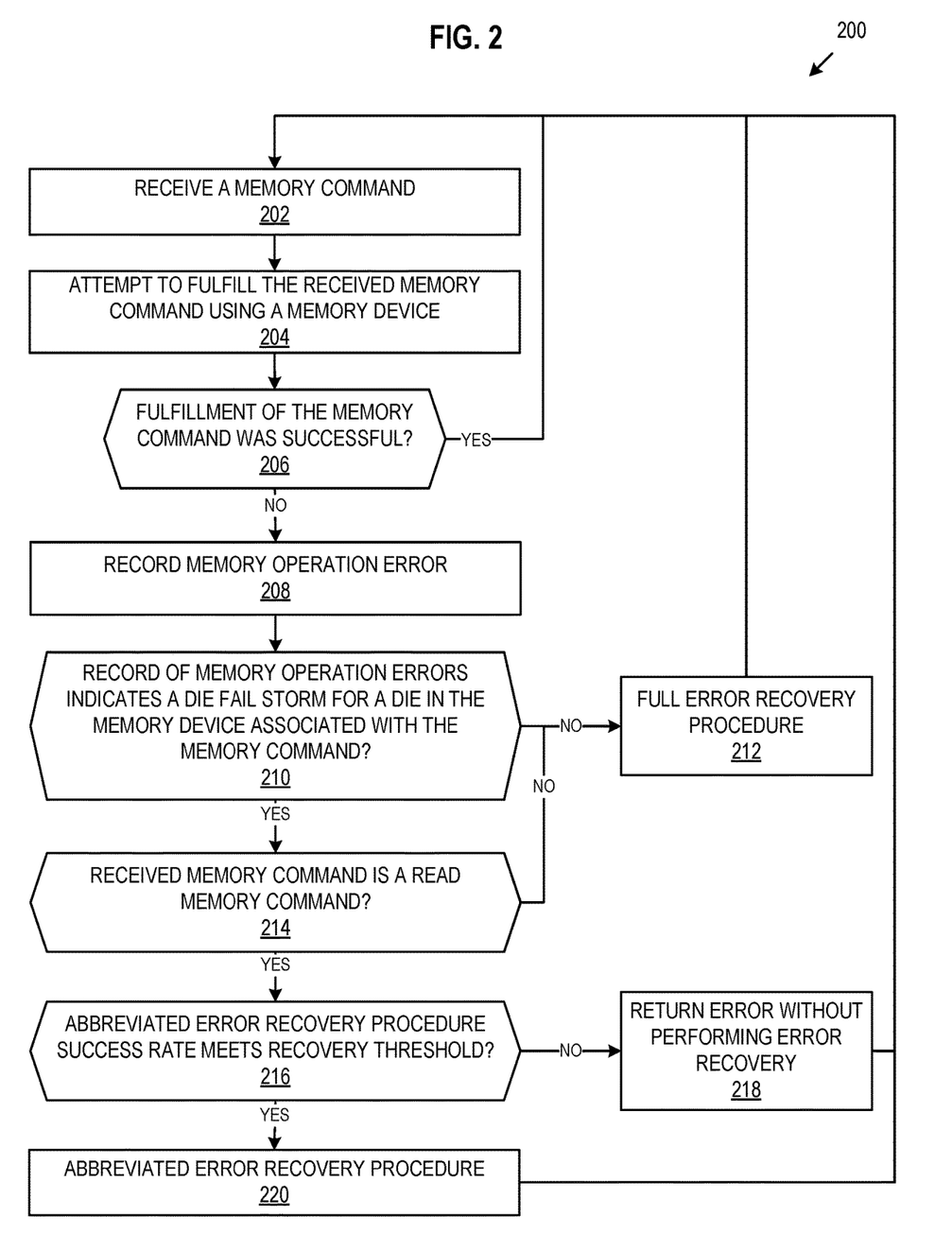
FIG. 2 is a flow diagram of an example method to detect and mitigate memory errors to account for a failed memory die, in accordance with some embodiments of the present disclosure.

FIG. 2 is a flow diagram of an example method 200 to detect and mitigate memory errors to account for a failed memory die, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the error processing component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 202, the processing device receives a memory command for processing. For example, a particular core of the memory subsystem 110 can receive the memory command, which can be a program, erase, or read memory command, and the processing device can place/add the received memory command to a command buffer for processing. The memory command can be an internally generated memory command (e.g., a memory command that is triggered or part of a garbage collection process) or the memory command can originate from the host system 120. For example, the memory command can be a read memory command from the host system 120 that seeks to read data from an indicated address of the memory devices 130/140. The indicated address can correspond to a particular die/LUN in the memory devices 130/140.

At operation 204, the processing device attempts to fulfill the received memory command using the memory devices 130/140. For example, when the memory command is a read memory command from the host system 120, the processing device attempts to read pages from an addressed die of the memory devices 130/140 and return the read data to the host system 120. In some cases, the data in the addressed location of the memory devices 130/140 can be stored with error correcting code (ECC), such that the processing device can correct for a set of bit errors (e.g., up to two-bit errors) in the corresponding read data. When the memory command is a program or erase memory command, the processing device attempts to program or erase the addressed die of the memory devices 130/140. In some embodiments, a particular core in the memory subsystem 110 receives the memory command (sometimes referred to as the receiving core) and the memory command is placed into a command buffer, which includes a discrete number of slots/entries. In some embodiments, a separate core retrieves the memory command from the command buffer for processing (sometimes referred to as the processing core). In other embodiments, the receiving core can receive the memory command and generate a set of lower-level memory commands for fulfilling the received higher-level memory command. The receiving core places the lower-level memory commands in the command buffer for retrieval and processing by the processing core that directly accesses the memory devices 130/140.

At operation 206, the processing device determines if the attempt to fulfill the received memory command was successful. For example, when the memory command is a read memory command from the host system 120, the processing device determines that the attempt to fulfill the memory command is successful when the processing device reads the data from the memory devices 130/140 and returns the read data to the host system 120 without re-reading the memory devices 130/140 with different trim/read voltage settings; a RAIN recovery procedure; and/or similar error recovery processes. In some embodiments, the processing device can determine that the fulfillment attempt was successful when ECC is needed to remove bit errors from the read data but re-reading the memory devices 130/140 with different trim/read voltage settings, RAIN, and/or similar error recovery processes are not needed. In some embodiments, the processing core delivers confirmation of successful or unsuccessful fulfillment of the memory command to the receiving core. In response to the processing device determining that the attempt to fulfill the received memory command was successful, the method 200 returns to operation 202. Conversely, in response to the processing device determining that the attempt to fulfill the received memory command was unsuccessful, the method 200 moves to operation 208.

Figure 3:
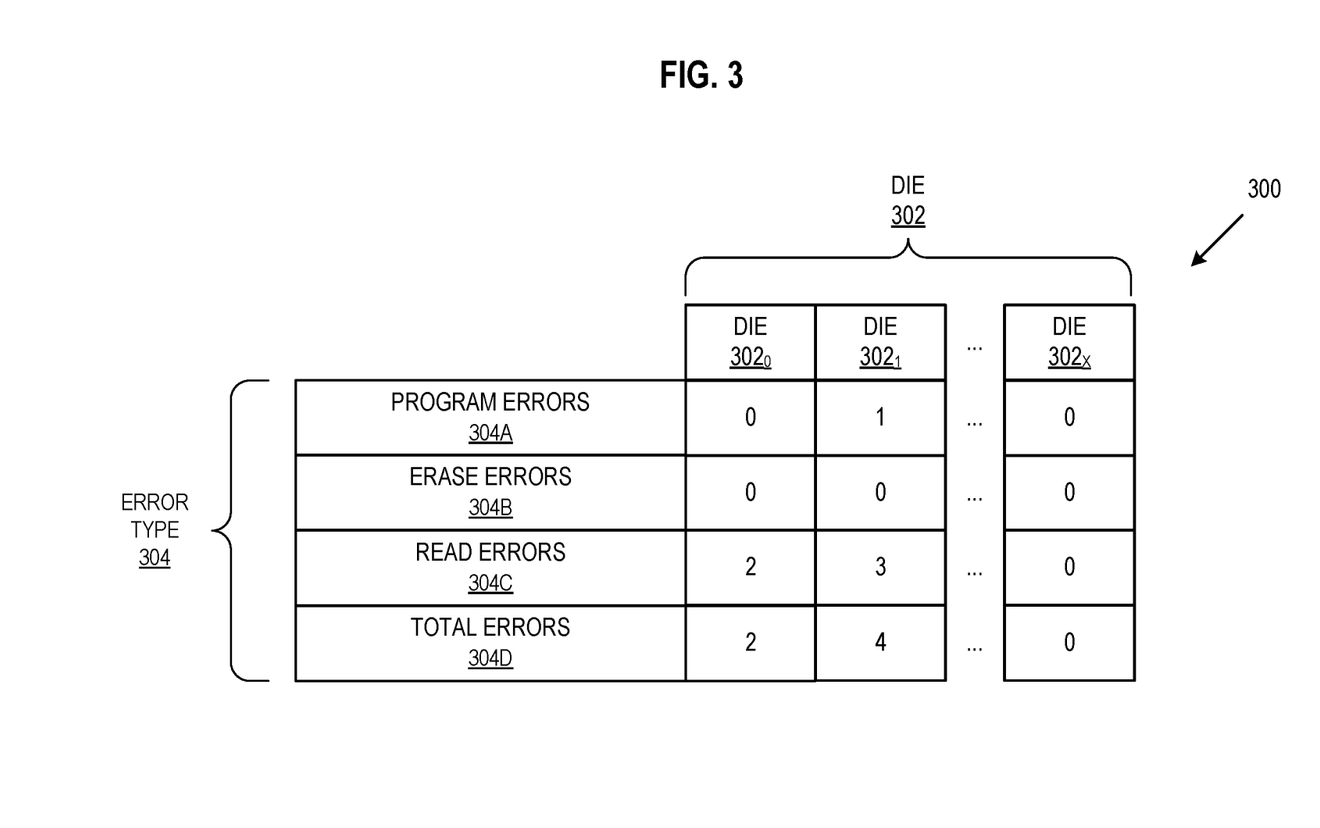
FIG. 3 shows an error record table to track errors across dice in the memory subsystem, in accordance with some embodiments of the present disclosure.

At operation 208, the processing device records the memory error in relation to the received/failed memory command. In particular, the memory subsystem 110 can track the number of memory command errors in the memory subsystem 110 (i.e., errors that result in a corresponding memory command to not be fulfilled or errors that require an error recovery process to fulfill the memory command). In some embodiments, the processing device tracks errors in the memory subsystem 110 per die/LUN and/or per type of memory command. For example, each time a memory error occurs, a flash translation layer (FTL) error handler of the memory subsystem 110 receives a report of the error and the error is added to an error request queue to be handled sequentially. The FTL error handler can track sources (e.g., an associated die) and other metadata associated with detected errors. For example, FIG. 3 shows an error record table 300 that can be used by the FTL error handler or another component of the memory subsystem 110 to track errors. As shown in FIG. 3, the error record table 300 tracks/records errors per die 302 and per error type 304. In particular, the error record table 300 tracks errors or failures in the memory subsystem 110 in association with (1) dies $302_0$-$302_X$ in the memory devices 130/140 and (2) three error types 304: program errors 304A, erase errors 304B, and read errors 304C (the sum of these error types 302 for each die 302 is represented as the total errors 304D). Based on the error record table 300, the processing device increments a corresponding value based on the die 302 and error type 304 associated with the error. For example, FIG. 3 shows that die $302_0$ has experienced 0 program errors 304A, 0 erase errors 304B, and 2 read errors 304C (2 total errors 304D); die $302_1$ has experienced 1 program errors 304A, 0 erase errors 304B, and 3 read errors 304C (4 total errors 304D); and die $302_X$ has experienced 0 program errors 304A, 0 erase errors 304B, and 0 read errors 304C (0 total errors 304D).

At operation 210, the processing device determines if the record of memory operation errors indicates a die fail storm for a die in the memory device 130/140 associated with the received memory command. In particular, the processing device can determine that a die is failing or has failed based on one or more of (1) a rate of incoming errors and (2) a type or source of incoming errors (i.e., a die indication). In particular, the processing device can determine that the rate of incoming errors to the memory subsystem 110 meets an error rate threshold and a number of errors that meet the error rate threshold correspond to a particular die associated with the received memory command.

For example, the processing device can compare the number of program errors 304A, erase errors 304B, read errors 304C, and/or total errors 304D per die 302 to a set of thresholds to determine if the die 302 is failing. For instance, the error record table 300 can represent errors during a discrete time period (e.g., a previous one minute). In response to the processing device determining that the total errors 304D for the die $302_1$ meets an error rate threshold (e.g., 100 per minute), the processing device can determine that the record of memory operation errors indicates that die $302_1$ is failing or has failed (i.e., a fail/failure storm). Namely, in response to determining that the number of errors experienced by a particular die 302 is greater than or equal to an indicated rate (e.g., the error rate threshold), the processing device determines that the die 302 is failing or has failed. In some embodiments, the error rate threshold can be dynamically set. For example, as noted above, each time an error occurs, an FTL error handler of the memory subsystem 110 receives a report of the error. As errors are added to an error request queue, the FTL error handler removes and handles each error sequentially. The FTL error handler or another component of the memory subsystem 110 can record the time it takes to process each error from the error request queue and use this error time (e.g., a running average of time to process errors) to determine the error rate threshold. In one embodiment, the error rate threshold indicates the number of entries in the error request queue before a die failure is detected. For example, the error rate threshold can be set to ten entries such that when ten entries are present in the error request queue and each of these ten entries focus on a single die 302 (e.g., the die $302_1$), the processing device can determine that a die 302 has failed.

In some embodiments, the processing device tracks the number of good and failed blocks in each die 302. In these embodiments, the processing device can compare the number of good and failed blocks in a die 302 to determine if the die has failed. For example, when the number of failed blocks equals or exceeds the number of good blocks in a die 302, the processing device can determine that this die has failed. In some embodiments, the processing device determines whether a die 302 has failed based on both (1) the rate of incoming errors for the die (e.g., the total errors 304D for a die meets an error threshold) and (2) a comparison of the number of good and failed blocks in a die 302. In these embodiments, when both the rate of incoming errors meets the error threshold and the number of failed blocks equals or exceeds the number of good blocks in a die 302, the processing device can determine that this die has failed. In response to determining that a die 302 in the memory devices 130/140 has not failed, the method 200 moves to operation 212.

At operation 212, the processing device performs a full error recovery procedure. For example, when the failed memory command is a read memory command, the processing device can proceed through a multi-step error recovery procedure. In one embodiment, the full error recovery procedure includes (1) thirteen steps in which the processing device retries reading the die 302 (up to thirteen different tries) with modified trim settings, which indicate a read voltage for applying to a corresponding portion of the die 302 to read data from the die 302 with the possible use of ECC and (2) one step in which the processing device retrieves the data using RAIN recovery. In some embodiments, the thirteen read retry steps can include: (1) a first re-read of the die 302 with a first set of settings (e.g., trim/read voltage settings), which are the same settings that were originally used to read the die 302, and use of hard low-density parity-check (LDPC) coding, (2) when the previous re-read operation was unsuccessful, a second re-read of the die 302 with a second set of settings (e.g., decreasing the trim/read voltage settings by 4 millivolts) and use of hard LDPC coding, (3) when the previous re-read operations were unsuccessful, a third re-read of the die 302 with a third set of settings (e.g., increasing the trim/read voltage settings by 4 millivolts) and use of hard LDPC coding, (4) when the previous re-read operations were unsuccessful, a fourth re-read of the die 302 with a fourth set of settings (e.g., decreasing the trim/read voltage settings by 8 millivolts) and use of hard LDPC coding, (5) when the previous re-read operations were unsuccessful, a fifth re-read of the die 302 with a fifth set of settings (e.g., increasing the trim/read voltage settings by 8 millivolts) and use of hard LDPC coding, (6) when the previous re-read operations were unsuccessful, a sixth re-read of the die 302 with a sixth set of settings (e.g., decreasing the trim/read voltage settings by 16 millivolts) and use of hard LDPC coding, (7) when the previous re-read operations were unsuccessful, a seventh re-read of the die 302 with a seventh set of settings (e.g., increasing the trim/read voltage settings by 16 millivolts) and use of hard LDPC coding, (8) when the previous re-read operations were unsuccessful, an eighth re-read of the die 302 with an eighth set of settings (e.g., decreasing the trim/read voltage settings by 32 millivolts) and use of hard LDPC coding, (9) when the previous re-read operations were unsuccessful, a ninth re-read of the die 302 with a ninth set of settings (e.g., increasing the trim/read voltage settings by 32 millivolts) and use of hard LDPC coding, (10) when the previous re-read operations were unsuccessful, a tenth re-read of the die 302 with the first set of settings and with a corrective read operation (e.g., the memory devices 130/140 reads from adjacent wordlines and uses voltages attained from reading these adjacent wordlines to adjust a wordline threshold of the current wordline) and hard LDPC coding, (11) when the previous re-read operations were unsuccessful, an eleventh re-read of the die 302 with the first set of settings and soft LDPC, (12) when the previous re-read operations were unsuccessful, a twelfth re-read of the die 302 with the sixth set of settings and use of auto calibration no persistence (e.g., auto calibration without persisted values from a previous calibration), and (13) when the previous re-read operations were unsuccessful, a thirteenth re-read of the die 302 with the seventh set of settings and use of auto calibration no persistence.

As noted above, the full error recovery procedure includes a RAIN recovery procedure. In one embodiment, the memory subsystem 110 stores separate user data (along with possible ECC data) in pages of two or more dies and stores RAIN recovery data (e.g., exclusive-or (XOR) result data) in pages of another die. In particular, upon writing separate user data to two pages of two separate dice (i.e., source dice) of the memory devices 130/140, the memory subsystem 110 performs an exclusive-or (XOR) operation on the two separate pieces of user data (along with possible ECC data) and stores the result in a page of another die (i.e., a result die). In this configuration, if either of the pages of the source dice, which store the user data, is corrupted or otherwise lost (e.g., an entire source die has failed), the memory subsystem 110 can perform an exclusive-or operation with the accessible page of user data from the fully functioning source die and the original XOR result in the result die to recover the lost page of user data. Although this RAIN recovery procedure is described in relation to two source dice, the RAIN recovery procedure can be extended to more than two source dice to recover user data from a single failed source die. Following performance of the full error recovery procedure at operation 212, the method 200 returns to operation 202.

Returning to operation 210, in response to the processing device determining that a die 302 in the memory devices 130/140 has failed, the method 200 moves to operation 214. At operation 214, the processing device determines if the received/failed memory command is a read memory command. In response to determining that the received memory command is not a read memory command (e.g., the received/failed memory command is a program or erase memory command), the method 200 moves to operation 212. Conversely, in response to determining that the received memory command is a read memory command, the method 200 moves to operation 216.

At operation 216, the processing device determines if historical use of an abbreviated/partial error recovery procedure meets a recovery threshold in relation to the die addressed by the current memory command. In particular, the abbreviated error recovery procedure can include a subset of the operations/commands from the full error recovery procedure. For example, the abbreviated error recovery procedure can include no read retry steps (e.g., none of the thirteen read retry steps described above) and only include a RAIN recovery procedure. The memory subsystem 110 can track the number of times the abbreviated error recovery procedure returned valid/correct user data in relation to each die. For example, the memory subsystem 110 can track the number of times a RAIN recovery procedure returned valid user data for per die in the memory devices 130/140. When the ratio/percentage of times the abbreviated error recovery procedure successfully returned valid user data for the die associated with the current memory command fails to meet the error recovery threshold (e.g., the error recovery threshold is 50%), the method 200 moves to operation 218.

At operation 218, the processing device returns an error without performing an error recovery procedure. For example, the memory subsystem 110 can return an error message to the host system 120.

Returning to operation 216, when the ratio/percentage of times the abbreviated error recovery procedure successfully returned valid user data for the die associated with the current memory command meets the error recovery threshold (e.g., the error recovery threshold is 50%), the method 200 moves to operation 220. At operation 220, the processing device performs the abbreviated error recovery procedure to attempt to fulfill the outstanding read memory command. In particular, the processing device can perform a RAIN recovery procedure to recover user data from a failed die in the memory devices 130/140.

Figure 4:
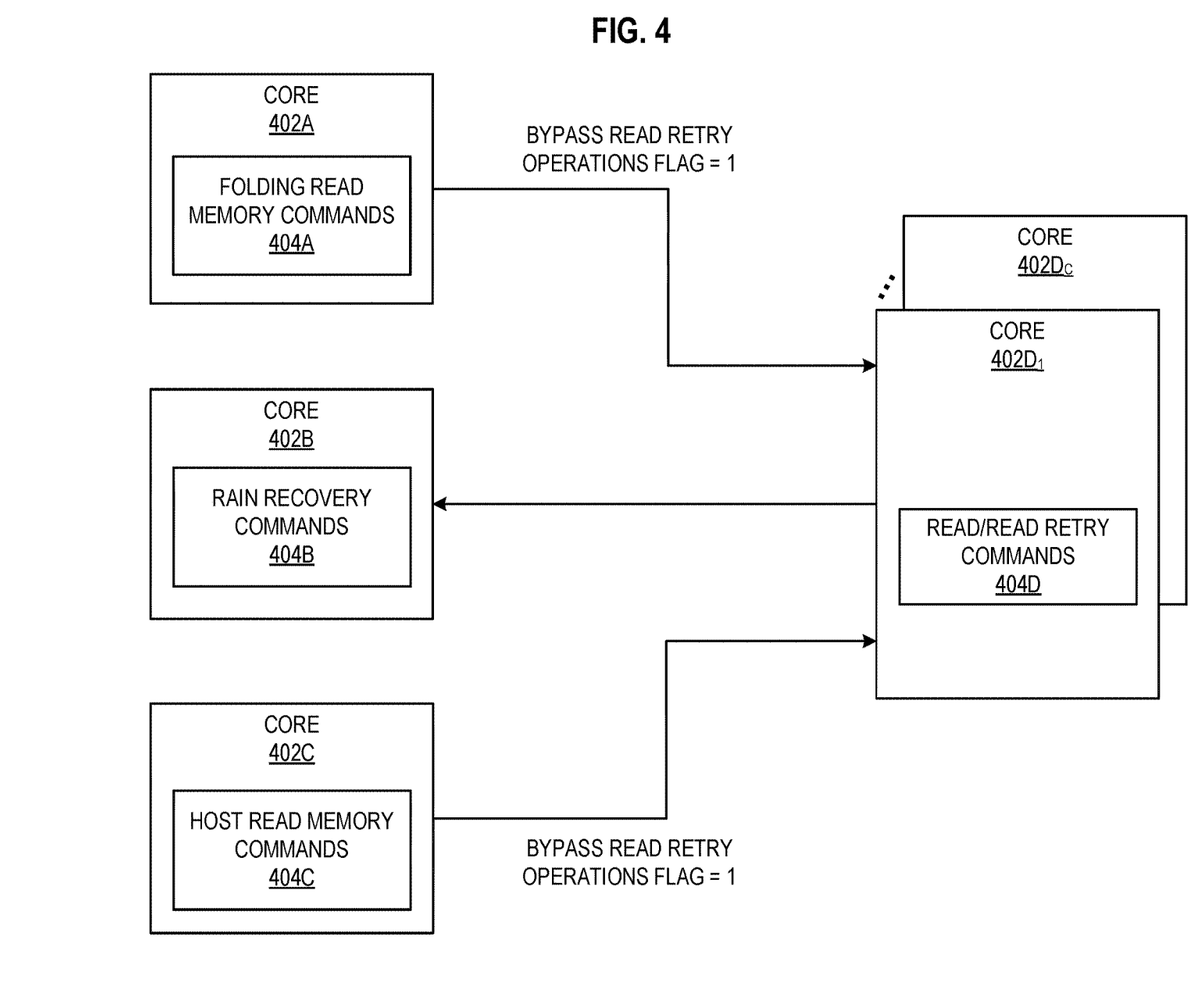
FIG. 4 shows a set of cores of the memory subsystem, in accordance with some embodiments of the present disclosure.

In some embodiments, the memory subsystem 110 includes a hierarchy of processing cores, which work together to fulfill memory commands. For example, FIG. 4 shows a set of cores 402 of a memory subsystem 110. As shown, the core 402A performs high-level folding read memory commands 404A, the core 402B performs high-level RAIN recovery commands 404B, the core 402C performs high-level operations in relation fulfilling host read memory commands 404C, and the cores $402D_1$-$402D_C$ perform low-level read and read retry commands 404D. For example, the core 402A receives or generates a folding read memory command 404A for folding one block/block stripe into another block/block stripe for the purposes of garbage collection. In response to the folding read memory command 404A, the core 402A generates and transmits a set of low-level commands to the cores 402D. In one embodiment, each of the cores 402D corresponds to a separate channel of the memory devices 130/140 and the lower-level commands are read/read retry commands 404D that cause the cores 402D to access corresponding channels of the memory devices 130/140. In some embodiments, the lower-level commands include one or more of an address to read from, buffer pointers corresponding to where the data is to be stored following the read, and a set of flags. In some embodiments, the set of flags can indicate to the cores 402D whether read retry commands are to be performed following unsuccessful fulfillment of a read memory command. For example, a bypass read retry operation flag can be set to (1) the logical value of "0" to indicate that read retry commands/operations are to be performed following unsuccessful fulfillment of a read memory command (corresponding to a full error recovery procedure) and (2) the logical value of "1" to indicate that read retry commands/operations are not to be performed following unsuccessful fulfillment of a read memory command (corresponding to an abbreviated/partial error recovery procedure). For example, the core 402A can determine that a particular die associated with a read memory command is likely failing and set the bypass read retry operation flag to the logical value of "1" such that read retries are not to be performed following a read failure, since these retry operations will not likely be successful and will waste resources unnecessarily (e.g., time and processing resources). A response to the set of low-level commands is sent by the cores 402D to the core 402A (e.g., the successfully read user data is sent back to the core 402A or an indication that the cores 402D were unable to read data from the addressed die/channel of the memory devices 130/140). When the cores 402D determine that a RAIN recovery procedure is necessary, the cores 402D trigger the core 402B to perform the RAIN recovery procedure and the core 402B returns the read/retrieved data to the requesting cores 402 (e.g., the core 402A or the core 402C).

In some embodiments, operations 216 and 218 are optional and the method 200 moves directly from operation 214 to operation 220 upon the processing device determining that the received/failed memory command is a read memory command. In particular, the processing device performs the abbreviated error recovery procedure without consideration for historical use/trends of the abbreviated error recovery procedure. In some embodiments, operations 216 and 220 are optional and the method 200 moves directly from operation 214 to operation 218 upon the processing device determining that the received/failed memory command is a read memory command. In particular, the processing device returns an error without performing an error recovery procedure.

Figure 5:
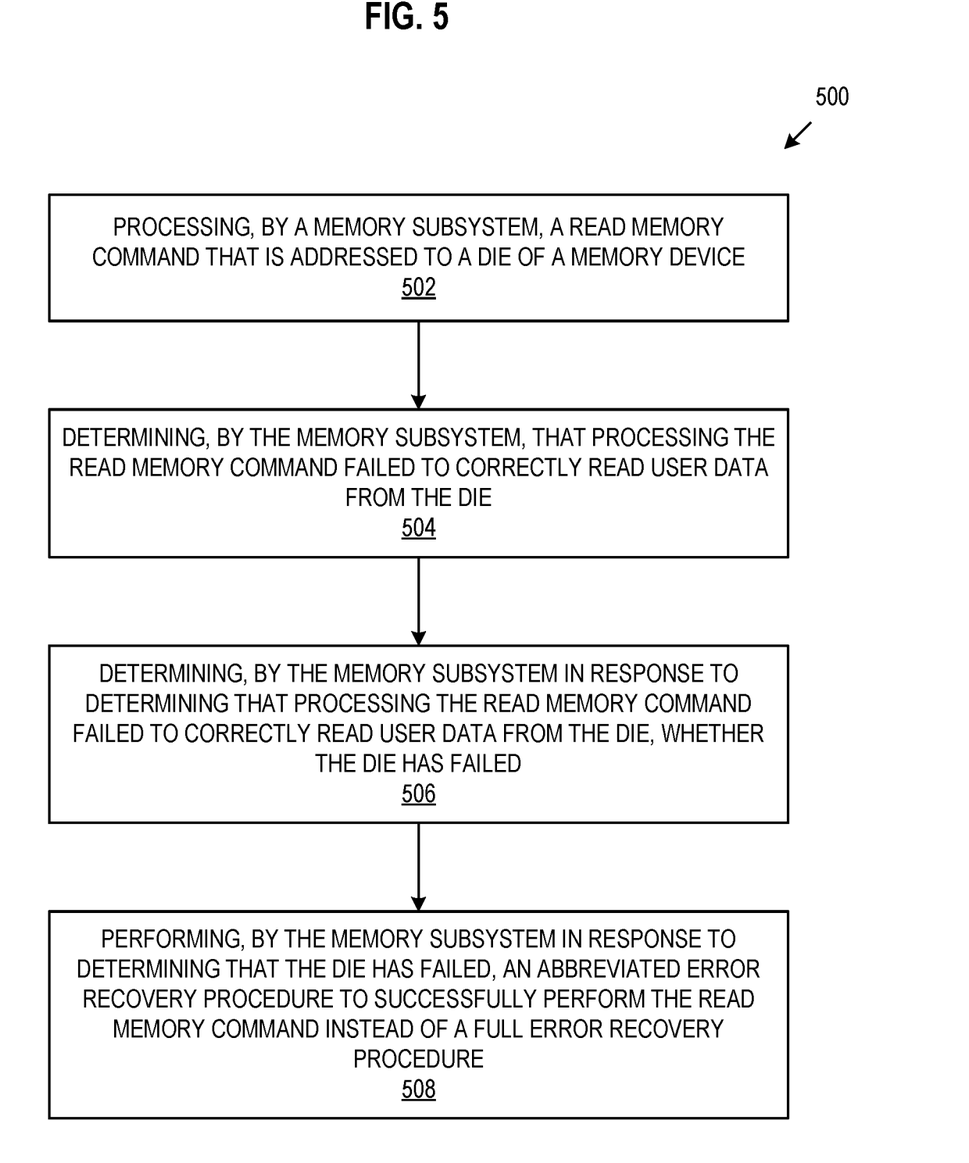
FIG. 5 is a flow diagram of another example method to detect and mitigate memory errors to account for a failed memory die, in accordance with some embodiments of the present disclosure.

FIG. 5 is a flow diagram of an example method 500 to detect and mitigate memory errors to account for a failed memory die, in accordance with some other embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the error processing component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing device processes a read memory command addressed to a die of a memory device (e.g., the memory devices 130/140). For example, the processing device attempts to read pages from an addressed die of the memory devices 130/140 and return the read data to the host system 120. In some cases, the data in the addressed location of the memory devices 130/140 can be stored with error correcting code (ECC), such that the processing device can correct for a set of bit errors (e.g., up to two-bit errors) in the corresponding read data.

At operation 504, the processing device determines that processing the read memory command failed to correctly/successfully read data from the die of the memory device. In particular, even with the use of ECC, the processing device is unable to correct bit errors introduced to the user data while stored in the die of the memory device.

At operation 506, the processing device determines, in response to determining that processing the read memory command failed to correctly read user data from the first die, whether the die has failed. In particular, the memory subsystem 110 can track memory command errors in relation to each die of the memory devices 130/140. In these embodiments, the memory subsystem 110 can determine a rate of incoming errors for the die. When the rate of incoming errors for the die is high (e.g., the rate of incoming errors meets a threshold), the memory subsystem 110 determines that the die has likely failed. Namely, when the number of program, erase, and/or read errors reaches a particular level/threshold during a discrete period of time, the likely cause of this high rate of incoming errors is the failure of the die, such that no memory commands can be fulfilled by the die. Conversely, while the rate of incoming errors for the die fails to meet a particular rate/threshold, the memory subsystem 110 does not determine/conclude that the die has failed.

At operation 508, the processing device performs, in response to determining that the die has failed, an abbreviated error recovery procedure to successfully perform the read memory command instead of a full error recovery procedure. The full error recovery procedure can include multiple read retries of the die in addition to a RAIN recovery procedure (when all the read retries fail). However, when the number/rate of errors for a particular die meets a threshold (e.g., is above a threshold), the memory subsystem 110 performs an abbreviated error recovery procedure. The abbreviated error recovery procedure includes a subset of the operations of the full error recovery procedure. For example, the abbreviated error recovery procedure only includes a RAIN recovery procedure. The technique ensures that resources devoted to error recovery are not wasted on operations that are unlikely to be successful. Namely, if there are a high number of errors associated with a particular die, the die has likely failed and performing read retry operations on the die will unlikely produce a successful result.

Figure 6:
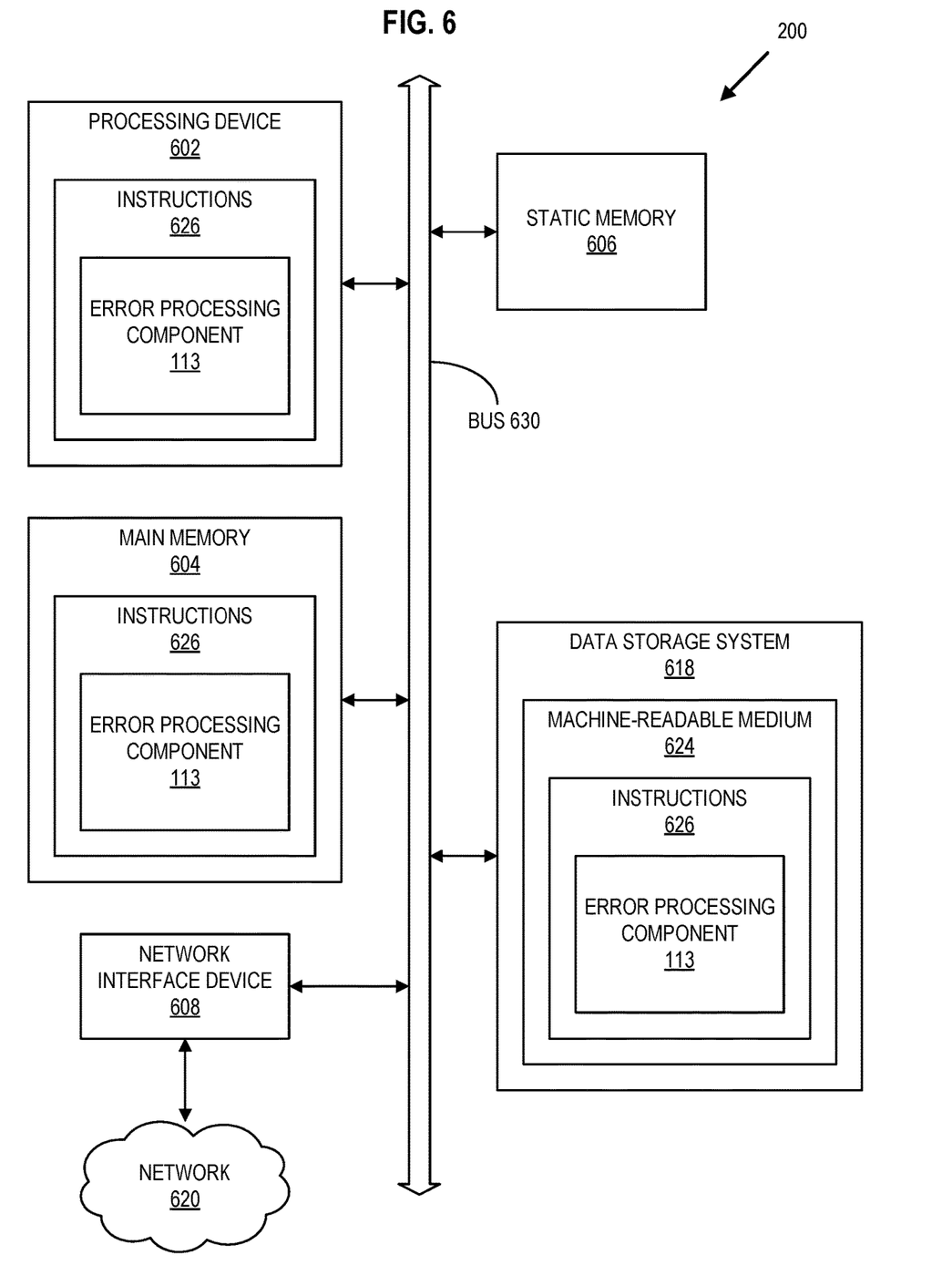
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the error processing component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory subsystem 110 of FIG. 1.

In one embodiment, the instructions 626 include instructions to implement functionality corresponding to an error processing component (e.g., the error processing component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 200 and 500 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   processing, by a memory subsystem, a first operation corresponding to a first read memory command that is addressed to a first die of a memory device;
   determining, by the memory subsystem, that processing the first operation corresponding to the first read memory command failed to correctly read first user data from the first die;
   determining, by the memory subsystem in response to determining that processing the first operation corresponding to the first read memory command failed to correctly read the first user data from the first die, whether the first die has failed; and
   performing, by the memory subsystem in response to determining that the first die has failed, an abbreviated error recovery procedure to successfully perform the first operation corresponding to the first read memory command instead of a full error recovery procedure, wherein the abbreviated error recovery procedure skips one or more operations of the full error recovery procedure.

2. The method of claim 1, further comprising:
   processing, by the memory subsystem, a second operation corresponding to a second read memory command that is addressed to a second die of the memory device;
   determining, by the memory subsystem, that processing the second operation corresponding to the second read memory command failed to correctly read second user data from the second die;
   determining, by the memory subsystem in response to determining that processing the second operation corresponding to the second read memory command failed to correctly read the second user data from the second die, whether the second die has failed; and
   performing, by the memory subsystem in response to determining that the second die has not failed, the full error recovery procedure to successfully perform the second operation corresponding to the second read memory command.

3. The method of claim 1, wherein the full error recovery procedure includes a set of read retries on a corresponding die using a set of read voltages and a redundant array of independent negative AND (NAND) (RAIN) recovery procedure when the set of retries on the corresponding die fails, and
   wherein the abbreviated recovery procedure consists of the RAIN recovery procedure.

4. The method of claim 3, wherein the RAIN recovery procedure includes:
   reading first data from a second die of the memory device;
   reading second data from a third die of the memory device; and performing an exclusive-or operation with the first data and the second data to generate the first user data.

5. The method of claim 1, further comprising:
determining, in response to determining that the first die has failed, a historical rate of success of a redundant array of independent negative AND (NAND) (RAIN) recovery procedure in relation to the first die,
wherein the abbreviated error recovery procedure is performed further in response to determining that the historical rate of success of the RAIN recovery procedure in relation to the first die fails to meet a recovery threshold.

6. The method of claim 5, further comprising:
generating, by the memory subsystem in response to determining that the historical rate of success of the RAIN recovery procedure in relation to the first die failing to meet a recovery threshold, an error message, which indicates that the first operation corresponding to the first read memory command could not be fulfilled.

7. The method of claim 1, further comprising:
tracking, by the memory subsystem, memory command errors per die in the memory device, including the first die,
wherein the tracking includes recording a read memory command error in response to failing to correctly read the first user data from the first die.

8. A non-transitory computer-readable storage medium comprising instructions that, when executed by a processing device, cause the processing device to:
process a first operation corresponding to a first read memory command that is addressed to a first die of a memory device of a memory subsystem;
determine that processing the first operation corresponding to the first read memory command failed to correctly read first user data from the first die;
determine, in response to determining that processing the first operation corresponding to the first read memory command failed to correctly read the first user data from the first die, whether the first die has failed; and
perform, in response to determining that the first die has failed, an abbreviated error recovery procedure to successfully perform the first operation corresponding to the first read memory command instead of a full error recovery procedure wherein the abbreviated error recovery procedure skips one or more operations of the full error recovery procedure.

9. The non-transitory computer-readable storage medium of claim 8, wherein the processing device is further to:
process a second operation corresponding to a second read memory command that is addressed to a second die of the memory device;
determine that processing the second operation corresponding to the second read memory command failed to correctly read second user data from the second die;
determine, in response to determining that processing the second operation corresponding to the second read memory command failed to correctly read the second user data from the second die, whether the second die has failed; and
perform, in response to determining that the second die has not failed, the full error recovery procedure to successfully perform the second operation corresponding to the second read memory command.

10. The non-transitory computer-readable storage medium of claim 8, wherein the full error recovery procedure includes a set of read retries on a corresponding die using a set of read voltages and a redundant array of independent negative AND (NAND) (RAIN) recovery procedure when the set of retries on the corresponding die fails, and
wherein the abbreviated recovery procedure consists of the RAIN recovery procedure.

11. The non-transitory computer-readable storage medium of claim 10, wherein the RAIN recovery procedure includes:
reading first data from a second die of the memory device;
reading second data from a third die of the memory device; and
performing an exclusive-or operation with the first data and the second data to generate the first user data.

12. The non-transitory computer-readable storage medium of claim 8, wherein the processing device is further to:
determine, in response to determining that the first die has failed, a historical rate of success of a redundant array of independent negative AND (NAND) (RAIN) recovery procedure in relation to the first die,
wherein the abbreviated error recovery procedure is performed further in response to determining that the historical rate of success of the RAIN recovery procedure in relation to the first die fails to meet a recovery threshold.

13. The non-transitory computer-readable storage medium of claim 12, wherein the processing device is further to:
generate, in response to determining that the historical rate of success of the RAIN recovery procedure in relation to the first die failing to meet a recovery threshold, an error message, which indicates that the first operation corresponding to the first read memory command could not be fulfilled.

14. The non-transitory computer-readable storage medium of claim 8, wherein the processing device is further to:
track memory command errors per die in the memory device, including the first die,
wherein the tracking includes recording a read memory command error in response to failing to correctly read the first user data from the first die.

15. A system comprising:
a memory device; and
a processing device, operatively coupled with the memory device, to:
process a first read operation corresponding to a first memory command that is addressed to a first die of the memory device;
determine, in response to determining that processing the first operation corresponding to the first read memory command failed to correctly read first user data from the first die, whether the first die has failed; and
perform, in response to determining that the first die has failed, an abbreviated error recovery procedure to successfully perform the first operation corresponding to the first read memory command instead of a full error recovery procedure, wherein the abbreviated error recovery procedure skips one or more operations of the full error recovery procedure.

16. The system of claim 15, wherein the processing device is further to:
process a second operation corresponding to a second read memory command that is addressed to a second die of the memory device;

determine that processing the second operation corresponding to the second read memory command failed to correctly read second user data from the second die;

determine, in response to determining that processing the second operation corresponding to the second read memory command failed to correctly read the second user data from the second die, whether the second die has failed; and perform, in response to determining that the second die has not failed, the full error recovery procedure to successfully perform the second operation corresponding to the second read memory command.

17. The system of claim 15, wherein the full error recovery procedure includes a set of read retries on a corresponding die using a set of read voltages and a redundant array of independent negative AND (NAND) (RAIN) recovery procedure when the set of retries on the corresponding die fails, and wherein the abbreviated recovery procedure consists of the RAIN recovery procedure.

18. The system of claim 17, wherein the RAIN recovery procedure includes:

reading first data from a second die of the memory device;

reading second data from a third die of the memory device; and performing an exclusive-or operation with the first data and the second data to generate the first user data.

19. The system of claim 15, wherein the processing device is further to:

determine, in response to determining that the first die has failed, a historical rate of success of a redundant array of independent negative AND (NAND) (RAIN) recovery procedure in relation to the first die, wherein the abbreviated error recovery procedure is performed further in response to determining that the historical rate of success of the RAIN recovery procedure in relation to the first die fails to meet a recovery threshold.

20. The system of claim 19, wherein the processing device is further to:

generate, in response to determining that the historical rate of success of the RAIN recovery procedure in relation to the first die failing to meet a recovery threshold, an error message, which indicates that the first operation corresponding to the first read memory command could not be fulfilled.

* * * * *